H. P. GATCHELL.
Coffee Pot.
No. 26,229. Patented Nov. 22, 1859.
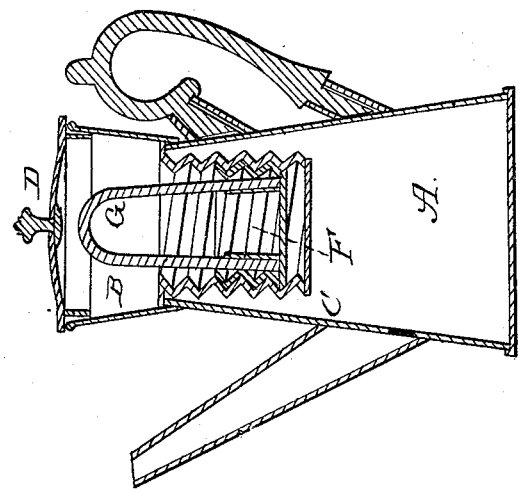
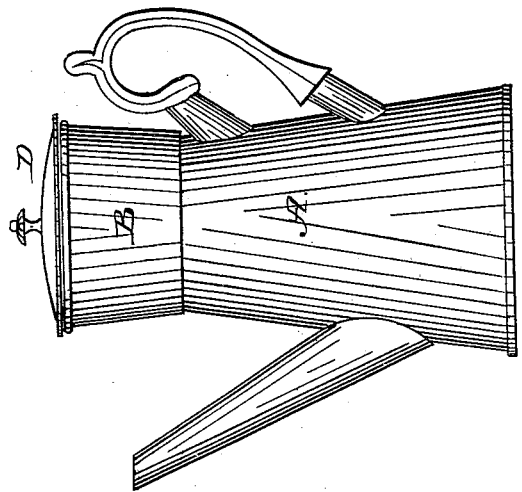
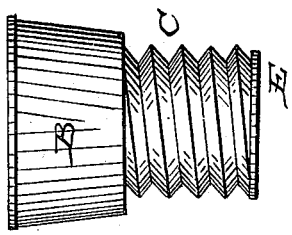
WITNESSES
INVENTOR

UNITED STATES PATENT OFFICE.

HORATIO P. GATCHELL, OF RAVENNA, OHIO, ASSIGNOR TO E. J. BATES, OF BEDFORD, OHIO.

COFFEE-POT.

Specification of Letters Patent No. 26,229, dated November 22, 1859.

*To all whom it may concern:*

Be it known that I, HORATIO P. GATCHELL, of Ravenna, in the county of Portage and State of Ohio, have invented new and useful Improvements in Coffee-Pots; and I do hereby declare that the following is a full and complete description of the construction and operation of the same, reference being had to the accompanying drawings, making part of this specification, in which—

Figure 1 is a side elevation of the coffee pot, Fig. 2 is a vertical section, and Figs. 3 and 4, are detached sections.

Like letters refer to like parts.

The nature of my invention relates to the means employed to compress the ground coffee between two perforated plates, which form the bottom of double cup, so constructed and arranged, that the hot water can percolate through the ground coffee thus confined and the strength of the drug obtained by displacement.

The body of the coffee pot, is constructed in the usual form, as seen at A in Figs. 1 and 2. The filtering cup consists of two parts, B and C. The part B, is external to the body of the coffee pot, and is placed upon the top, and is furnished with a cover D. The lower part of the filtering cup C is situated within the body of the coffee pot, as seen in Fig. 2. The walls of this part of the cup are swaged into the form of a screw, as seen in Fig. 3. The bottom of this cup, seen at E, is composed of a finely perforated plate, upon which the ground coffee rests. A follower F, Fig. 2, seen also detached in Fig. 4, is constructed in the form of a cup, the bottom of which E' is composed of a perforated plate like that of the cup B, C. The sides of the cup F, are also formed into a screw, which is of suitable size to fit inside of the cup C, which forms a nut for the same. The cup F, Figs. 3 and 4, has a wire handle G, soldered upon the inside by means of which the cup F can be screwed into the cup C, or removed therefrom.

In using this coffee pot, first, put the ground coffee into the bottom of the cup B, C. Spread it in a uniform layer over the perforated bottom E, then introduce the cup F and screw it down until the perforated bottom E' presses upon the ground coffee slightly. Then both are to be placed in the top of the body of the coffee pot as seen in Figs. 1 and 2, and boiling hot water poured into it in quantity sufficient for the desired amount of coffee. The cover D, should now be placed upon the cup B, and the whole left to stand quietly until the water has passed through the ground coffee, into the body of the pot below. The beverage is now ready to be poured out for use. Nothing need be added for settling the coffee, for it will be quite free from sediment and (if properly roasted) will possess a most excellent flavor.

What I claim as my improvement, and desire to secure by Letters Patent, is,

The forming of the walls of the cups B C, and F, with male and female screws as described, in combination with the perforated bottoms E and E', for the purpose of compressing the ground coffee and extracting the strength of the drug by displacement in the manner specified.

H. P. GATCHELL.

Witnesses:
   N. W. WHEETON,
   JOSIAH PIPER.